United States Patent
Park et al.

(10) Patent No.: US 11,336,668 B2
(45) Date of Patent: May 17, 2022

(54) METHOD AND APPARATUS FOR DETECTING ABNORMAL BEHAVIOR OF GROUPWARE USER

(71) Applicant: Penta Security Systems Inc., Seoul (KR)

(72) Inventors: Seung Young Park, Chuncheon-si (KR); Sang Gyoo Sim, Seoul (KR); Duk Soo Kim, Seoul (KR); Seok Woo Lee, Seoul (KR); Myung Jin Kim, Seoul (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 575 days.

(21) Appl. No.: 16/277,478

(22) Filed: Feb. 15, 2019

(65) Prior Publication Data

US 2020/0228552 A1 Jul. 16, 2020

(30) Foreign Application Priority Data

Jan. 14, 2019 (KR) .................. 10-2019-0004882
Jan. 28, 2019 (KR) .................. 10-2019-0010285

(51) Int. Cl.
*G06F 16/955* (2019.01)
*G06F 16/958* (2019.01)
*H04L 29/06* (2006.01)

(52) U.S. Cl.
CPC ........ *H04L 63/1425* (2013.01); *G06F 16/955* (2019.01); *G06F 16/958* (2019.01); *H04L 63/1416* (2013.01)

(58) Field of Classification Search
CPC . G06F 16/955; G06F 16/958; H04L 63/1416; H04L 63/1425
See application file for complete search history.

(56) References Cited

U.S. PATENT DOCUMENTS 8,887,286 B2 * 11/2014 Dupont .................. G06F 21/50
726/25
9,285,958 B1 * 3/2016 Hill ........................ G06F 3/0483
(Continued)

FOREIGN PATENT DOCUMENTS

JP 2014-531647 A 11/2014
JP 2017-41886 A 2/2017

OTHER PUBLICATIONS

Kuroki Kotomi et al., proposal of target Web application detecting method based on access pattern, Computer Security Symposium 2018, Information processing Society of Japan, Oct. 22, 2018.
(Continued)

*Primary Examiner* — Thomas J Dailey
(74) *Attorney, Agent, or Firm* — Goldilocks Zone IP Law (57) ABSTRACT

Disclosed is a method of detecting whether a groupware user's behavior is an abnormal behavior. The method includes acquiring a uniform resource identifier (URI) from the user's behavior, generating a URI sequence from the URI on the basis of a predetermined time interval, preprocessing the URI sequence to generate a primitive URI sequence, calculating a log probability value from the primitive URI sequence, and detecting whether the user's behavior is an abnormal behavior on the basis of the log probability value and a predetermined threshold value.

14 Claims, 5 Drawing Sheets

(56) References Cited

U.S. PATENT DOCUMENTS

| | | | |
|---|---|---|---|
| 9,379,952 B2* | 6/2016 | Li | H04L 61/2575 |
| 9,531,736 B1* | 12/2016 | Torres | H04L 63/1441 |
| 10,505,981 B2* | 12/2019 | Hunt | G06F 16/24578 |
| 2014/0165140 A1 | 6/2014 | Singla et al. | |
| 2015/0348071 A1* | 12/2015 | Cochrane | G06F 16/958 |
| | | | 705/7.32 |
| 2016/0171494 A1* | 6/2016 | Jiang | G06Q 20/40 |
| | | | 705/44 |
| 2019/0012683 A1* | 1/2019 | Jang | G06Q 30/0202 |

OTHER PUBLICATIONS

Jin Kim et al., Detection of Get Flooding DDoS Attacks using IP Session Trees, The Journal of Korea Institute of Information Technology, Aug. 2012, pp. 93-103, 10(8), Korean Institute of Information Technology, Korea.

* cited by examiner

ALGORITHM FOR CALCULATING INITIAL TP VALUE

Set $N_{ij}^* = 0$ for $0 \leq i, j \leq S - 1$

For each primitive URI sequence $x \in \mathcal{X}_{ini}$
    For $k = 0$ to $\dim(x) - 2$
        $N_{ij}^* = N_{ij}^* + 1$ if $x_k = i$ and $x_{k+1} = j$
    End For
End For For $i = 0$ to $S - 1$
    For $j = 0$ to $S - 1$
        $\hat{p}_{ij} = \dfrac{N_{ij}^*}{\sum_{j'} N_{ij'}^*}$
    End For
End For

FIG. 4

| ALGORITHM FOR UPDATING TP VALUE ACCORDING TO FIRST METHOD |
|---|
| Remove any anomaly primitive URI sequence in $\mathcal{X}_{d-D}$<br><br>For each primitive URI sequence $x \in \mathcal{X}_{d-D}$<br>    For $k = 0$ to $\dim(x) - 2$<br>        $N_{ij}^{(d-D)} = N_{ij}^{(d-D)} + 1$ if $x_k = i$ and $x_{k+1} = j$<br>    End For<br>End For<br><br>For $i = 0$ to $S - 1$<br>    For $j = 0$ to $S - 1$<br>        $N_{ij}^{*} = N_{ij}^{*} + N_{ij}^{(d-D)} - N_{ij}^{(d-D-U)}$<br>    End For<br>End For<br><br>For $i = 0$ to $S - 1$<br>    For $j = 0$ to $S - 1$<br>        $\hat{p}_{ij} = \frac{N_{ij}^{*}}{\sum_{j'} N_{ij'}^{*}}$<br>    End For<br>End For |

FIG. 5

| ALGORITHM FOR UPDATING TP VALUE ACCORDING TO SECOND METHOD |
|---|

Remove any anomaly primitive URI sequence in $\mathcal{X}_{d-D}$

For each primitive URI sequence $x \in \mathcal{X}_{d-D}$
    For $k = 0$ to $\dim(x) - 2$
        $N_{ij}^{(d-D)} = N_{ij}^{(d-D)} + 1$ if $x_k = i$ and $x_{k+1} = j$
    End For
End For For $i = 0$ to $S - 1$
    For $j = 0$ to $S - 1$
        $N_{ij}^* = \rho N_{ij}^* + (1 - \rho) N_{ij}^{(d-D)}$
    End For
End For For $i = 0$ to $S - 1$
    For $j = 0$ to $S - 1$
        $\hat{p}_{ij} = \frac{N_{ij}^*}{\sum_{j'} N_{ij'}^*}$
    End For
End For

METHOD AND APPARATUS FOR DETECTING ABNORMAL BEHAVIOR OF GROUPWARE USER

CLAIM FOR PRIORITY

This application claims priority to Korean Patent Applications No. 10-2019-0004882 filed on Jan. 14, 2019 and No. 10-2019-0010285 filed on Jan. 28, 2019 in the Korean Intellectual Property Office (KIPO), the entire contents of which are hereby incorporated by reference.

BACKGROUND

1. Technical Field

Example embodiments of the present invention relate in general to a method and apparatus for detecting an abnormal behavior of a groupware user and more specifically to a method and apparatus for detecting an abnormal behavior of a user using a uniform resource identifier (URI) generated when the user accesses groupware.

2. Related Art

Groupware, also called collaborative software, may be software that supports multiple users to simultaneously perform a common project in separate work environments. Here, individual users of groupware may access the groupware using access information respectively assigned to the users. When a piece of access information of the groupware is stolen by an attacker, the attacker may use a user's privilege itself.

In order to solve this problem, conventionally, a method of performing security measures, such as encryption, on access information itself or a method of blocking external access from an attacker have been mainly used. However, only such conventional methods cannot completely exclude an attacker from accessing groupware on behalf of a user, and thus there is a need for an alternative.

SUMMARY

Accordingly, example embodiments of the present invention are provided to substantially obviate one or more problems due to limitations and disadvantages of the related art.

Example embodiments of the present invention provide a method of detecting an abnormal behavior of a groupware user.

Example embodiments of the present invention also provide an apparatus for detecting an abnormal behavior of a groupware user.

In some example embodiments, a method of detecting an abnormal behavior includes acquiring a uniform resource identifier (URI) from a user's behavior; generating a URI sequence from the URI on the basis of a predetermined time interval; preprocessing the URI sequence to generate a primitive URI sequence; calculating a log probability value from the primitive URI sequence; and detecting whether the user's behavior is an abnormal behavior on the basis of the log probability value and a predetermined threshold value.

The generating of a URI sequence from the URI on the basis of a predetermined time interval may include, when there are a plurality of URIs, comparing a time interval between temporally adjacent URIs to the predetermined time interval and generating at least one URI sequence including at least one of the plurality of URIs.

The preprocessing of the URI sequence to generate a primitive URI sequence may include generating the primitive URI sequence by deleting a key value from at least one URI included in the URI sequence.

The calculating of a log probability value from the primitive URI sequence may include calculating a transition probability on the basis of at least one primitive URI included in the primitive URI sequence and calculating the log probability value on the basis of the transition probability.

The calculating of a transition probability on the basis of at least one primitive URI included in the primitive URI sequence may include calculating the transition probability on the basis of the primitive URI sequence and a primitive URI sequence generated from a preset date to a reference date corresponding to a date on which the user's behavior occurs.

The reference date corresponding to the date on which the user's behavior occurs may be determined as a preset number of days before the date on which the user's behavior occurs.

The detecting of whether the user's behavior is an abnormal behavior on the basis of the log probability value and a predetermined threshold value may include determining that the user's behavior is an abnormal behavior when the log probability value is less than the predetermined threshold value.

In other example embodiments, an apparatus for detecting an abnormal behavior includes a processor and a memory in which at least one command to be executed by the processor is stored, wherein the at least one command may be executed to acquire a URI from a user's behavior, be executed to generate a URI sequence from the URI on the basis of a predetermined time interval, be executed to preprocess the URI sequence to generate a primitive URI sequence, be executed to calculate a log probability value from the primitive URI sequence, and be executed to detect whether the user's behavior is an abnormal behavior on the basis of the log probability value and a predetermined threshold value.

When there are a plurality of URIs, the at least one command may be executed to compare a time interval between temporarily adjacent URIs to the predetermined time interval and generate at least one URI sequence including at least one of the plurality of URIs.

The at least one command may be executed to generate the primitive URI sequence by deleting a key value from at least one URI included in the URI sequence.

The at least one command may be executed to calculate a transition probability on the basis of at least one primitive URI included in the primitive URI sequence and may be executed to calculate the log probability value on the basis of the transition probability.

The at least one command may be executed to calculate the transition probability on the basis of the primitive URI sequence and a primitive URI sequence generated from a preset date to a reference date corresponding to a date on which the user's behavior occurs.

The reference date corresponding to the date on which the user's behavior occurs may be determined as a preset number of days before the date on which the user's behavior occurs.

When the log probability value is less than the predetermined threshold value, the at least one command may be executed to determine the user's behavior as an abnormal behavior.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like reference numerals refer to like elements throughout.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting the invention. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In describing the invention, in order to facilitate the entire understanding of the invention, like numbers refer to like elements throughout the description of the figures and the repetitive description thereof will be omitted. Exemplary embodiments of the present invention will be described below in more detail with reference to the accompanying drawings.

In the description of the present invention, groupware may mean software designed suitably to allow multiple users to do the same task or perform a common task on a schedule and may be used by members of corporations, institutions, organizations, and the like to cooperate with each other at computerized workplaces in order to increase work efficiency.

A Uniform Resource Identifier (URI) may be a string of characters that identifies a particular resource, and a Uniform Resource Locator (URL) and a Uniform Resource Name (URN) may be included as sub-concepts of a URI. To ensure consistency, all URIs may follow a predetermined set of syntax rules and may maintain scalability through a separately defined hierarchical naming scheme.

A URI sequence may refer to a plurality of URIs or a set of URIs that are sequentially generated according to a user's behavior when the user accesses groupware.

An abnormal behavior detection apparatus according to an embodiment of the present invention may define a user's behavior using a URI sequence generated according to a specific behavior. However, a URI changes according to the user's behavior, and thus the abnormal behavior detection apparatus may preprocess the generated URIs in order to prevent the user's similar behaviors from being determined as different behaviors.

The URI preprocessing process may refer to a process of removing or deleting a key value in a URI generated according to a user's behavior. Here, the key value may refer to a value which changes in a URI due to various factors such as a user's cookies, a posting number in a message board, and the like.

More specifically, two behaviors of a user accessing the same message board will be described as an example. A URI corresponding to when the user first accesses the same message board and a URI corresponding to when the user second accesses the same message board may be referred to as a first URI and a second URI respectively, which are assumed as shown in Table 1 below.

TABLE 1

| First URI | GET/Cm/CMCommon/GetLeftMenuTree?menu_id=1010000&id=0&_=1481156427 |
|---|---|
| Second URI | GET/Cm/CMCommon/GetleftMenuTree?menu_id=1010000&id=0&_=1481241824 |

Referring to Table 1, the first URI may have key values of 1010000, 0, and 1481156427, and the second URI may have key values of 1010000, 0, and 1481241824.

The abnormal behavior detection apparatus according to an embodiment of the present invention may remove or delete a key value from each URI as the preprocessing of the URIs in order to prevent the user's similar behaviors from being determined as different behaviors. The first URI and the second URI may be unified into one preprocessed URI as shown in Table 2 below.

TABLE 2

| PREPROCESSED URI | GET/Cm/CMCommon/GetLeftMenuTree?menu_id=&id=&_= |
|---|---|

Referring to Table 2, the first URI and the second URI may be unified into one preprocessed URI by the key values being deleted from the first URI and the second URI, and the preprocessed URI may be defined as a primitive URI.

The abnormal behavior detection apparatus according to an embodiment of the present invention may transform or unify a plurality of URIs into one preprocessed URI or a primitive URI through the above-described URI preprocessing process and may determine two behaviors of the user accessing the same message board as the same behavior on the basis of the primitive URI.

Since a user accesses groupware to perform a plurality of behaviors, the abnormal behavior detection apparatus according to an embodiment of the present invention may generate a URI sequence by listing a plurality of URIs generated for the plurality of behaviors in the order of generation. In other words, the abnormal behavior detection apparatus may remove key values by preprocessing the plurality of URIs generated for the plurality of behaviors of the user and may list a plurality of preprocessed URIs or a plurality of primitive URIs in the order of generation to generate a primitive URI sequence. A method of generating the primitive URI sequence will be described in detail with reference to FIG. 1.

Figure 1:
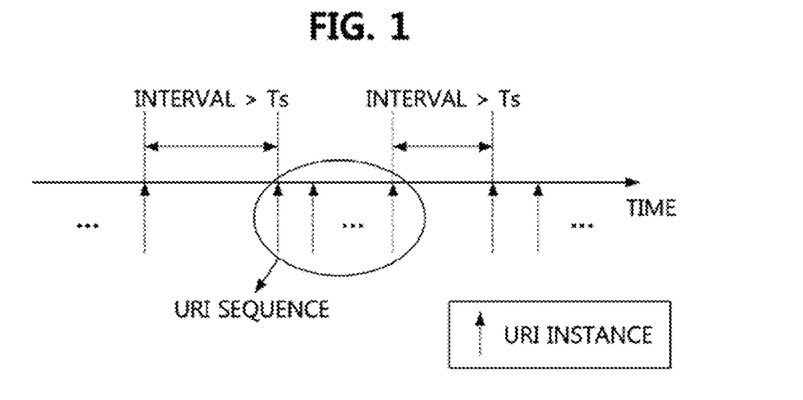
FIG. 1 is a diagram for describing a method of generating a primitive uniform resource identifier (URI) sequence according to an embodiment of the present invention.

FIG. 1 is a diagram for describing a method of generating a primitive URI sequence according to an embodiment of the present invention.

Referring to FIG. 1, a user may access groupware and perform at least one behavior, and one URI may be generated for each behavior. Here, one URI generated corresponding to one behavior may be referred to as a URI instance.

The abnormal behavior detection apparatus according to an embodiment of the present invention assumes that a user intermittently uses groupware, and a time interval for classifying a plurality of URIs as at least one URI sequence may be predetermined.

In other words, when a plurality of URI instances are generated and a time interval between two adjacent URI instances exceeds a predetermined time $T_s$, the abnormal behavior detection apparatus according to an embodiment of the present invention may determine that the preceding URI instance and the succeeding URI instance are classified as a series of different behaviors.

For example, it is assumed that first to sixth URI instances are sequentially generated, the time interval between the first URI instance and the second URI instance is two seconds, the time interval between the second URI instance and the third URI instance is one second, the time interval between the third URI instance and the fourth URI instance is five seconds, the time interval between the fourth URI instance and the fifth URI instance is three seconds, the time interval between the fifth URI instance and the sixth URI instance is two seconds, and the predetermined time $T_s$ is four seconds. The abnormal behavior detection apparatus according to an embodiment of the present invention may classify the third URI instance and the fourth URI instance as a series of different behaviors because the time interval between the adjacent URI instances is greater than four seconds.

In other words, the abnormal behavior detection apparatus according to an embodiment of the present invention may list or group and determine the first to fourth URI instances as a first URI set and may list or group and determine the fourth to sixth URI instances as a second URI set. Here, the URI set may be defined as a URI sequence.

Subsequently, the abnormal behavior detection apparatus according to an embodiment of the present invention may perform the above-described preprocessing on each of at least one URI instance included in one URI sequence. When the at least one URI instance is transformed into at least one primitive URI, a primitive URI set including the at least one primitive URI may be defined as a primitive URI sequence. In other words, the primitive URI sequence may mean that all URIs in the URI sequence are preprocessed.

When a user accesses groupware to perform a specific behavior, the abnormal behavior detection apparatus according to an embodiment of the present invention may generate a primitive URI sequence on the basis of a URI corresponding to the performed behavior according to the above description, calculate a normalized log probability (NLP) value on the basis of the primitive URI sequence, and compare the calculated NLP value to a predetermined threshold value to determine whether the user's specific behavior is an abnormal behavior.

In detail, the abnormal behavior detection apparatus may generate a primitive URI sequence according to the user's behavior and extract a primitive URI subsequence from the primitive URI sequence using a sliding window having a predetermined length with respect to the primitive URI sequence. Subsequently, the abnormal behavior detection apparatus may calculate a log probability (LP) value from the extracted primitive URI subsequence.

However, the length of the primitive URI sequence may be shorter than the predetermined length of the sliding window. In order to consider this case, the abnormal behavior detection apparatus may calculate a normalized LP value by dividing the calculated LP value of the primitive URI subsequence by the length of the primitive URI subsequence. Here, the normalized log probability (NLP) value of the primitive URI sequence may be calculated through a geometric mean because the NLP value is equal to the geometric mean of the product of transition probabilities (TPs) as expressed in Equation 1 below:

$$NLP = \frac{1}{K}\log(Pr(x_0\ x_1\ \ldots\ x_{K-1})) = \qquad \text{[Equation 1]}$$

$$\frac{1}{K}\left[\log Pr(x_0) + \sum_{k=0}^{K-2} \log Pr(x_{k+1} \mid x_k)\right],$$

where $x_k$ may indicate a $k_{th}$ primitive URI in a given primitive URI subsequence, and K may indicate the length of the given primitive URI subsequence. Also, $Pr(x_0)$ may indicate a probability value of $x_0$, and $Pr(x_{k+1}|x_k)$ may indicate a transition probability from $x_k$ to $x_{k+1}$. Here, the transition probability may be calculated by Equation 2 below:

$$Pr(x_{k+1} = j \mid x_k = i) = \frac{N_{ij}}{\sum_{j'} N_{ij'}}, \quad \text{[Equation 2]}$$

where $x_k$ may indicate a $k_{th}$ primitive URI in a given primitive URI subsequence, and $N_{ij}$ may indicate the number of times an $i^{th}$ primitive URI and a $j^{th}$ primitive URI are consecutively generated.

The abnormal behavior detection apparatus according to an embodiment of the present invention may calculate an NLP value corresponding to the user's behavior according to the above description and may determine that the user's behavior is an abnormal behavior when the calculated NLP value is less than the predetermined threshold value.

Here, the NLP value corresponding to the user's behavior is calculated using a TP value. However, the TP value is calculated on the basis of the user's past behavior, and thus may be updated by accumulating the user's behavior. A method of updating the TP value will be described in detail with reference to FIG. 2.

Figure 2:
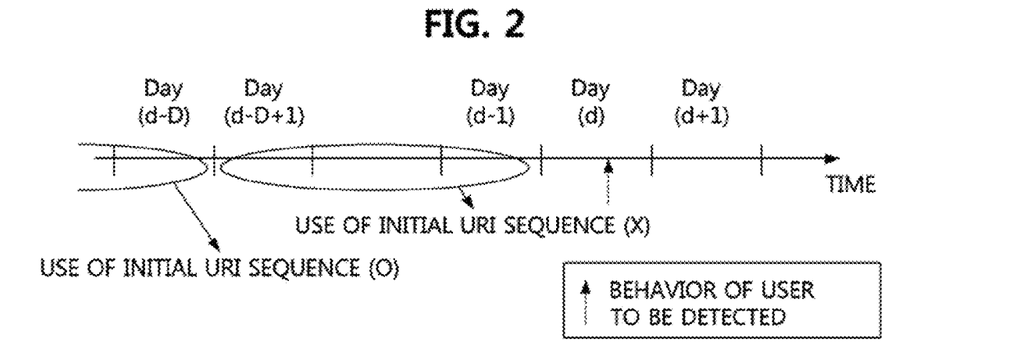
FIG. 2 is a diagram for describing a method of updating a transition probability (TP) value according to an embodiment of the present invention.

FIG. 2 is a diagram for describing the method of updating the TP value according to an embodiment of the present invention.

The abnormal behavior detection apparatus according to an embodiment of the present invention may update the TP value. The update of the TP value may be performed in real time or may be performed at regular intervals. A method of updating the TP value in real time will be described in detail. Here, the method of updating the TP value in real time may be a method of calculating the TP value again according to a date on which the user's behavior to be detected occurs. Accordingly, the method of calculating the TP value will be de described on the basis of the date on which the user's behavior occurs.

When the NLP value corresponding to the user's behavior is calculated, the abnormal behavior detection apparatus according to an embodiment of the present invention may calculate the TP value using a primitive URI sequence immediately before the user's behavior. When an abnormal behavior is included immediately before the user's behavior, however, the TP value may be inaccurate. Thus, the abnormal behavior detection apparatus according to an embodiment of the present invention may calculate the TP value using only a primitive URI sequence after the user's behavior and immediately before a reference date.

Referring to FIG. 2, it is assumed that the date on which the user's behavior to be detected occurs is d and the reference date is D. When the date on which the user's behavior occurs is Day d, the abnormal behavior detection apparatus according to an embodiment of the present invention may not use a primitive URI sequence from Day d−D+1 to Day d−1 in order to calculate the NLP value corresponding to the user's behavior and may calculate the TP value using a primitive URI sequence from a preset date to Day d-D.

Here, the primitive URI sequence used to calculate the TP value may include a primitive URI sequence generated from a preset date to a reference date corresponding to the date on which the user's behavior occurs, wherein the preset date is calculated from the reference date according to a preset period. A primitive URI sequence that is continuously accumulated from an initial state in which an abnormal behavior detection method according to the present invention is performed or a partial primitive URI sequence, which is a portion of the accumulated primitive URI sequence calculated using a specific method, may be used, but the present invention is not limited thereto.

Figure 3:
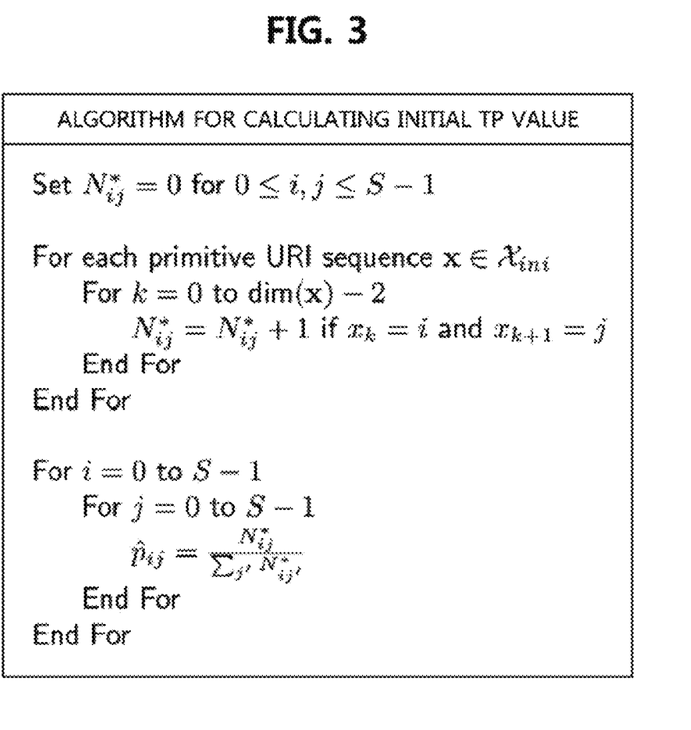
FIG. 3 is a diagram showing an algorithm for calculating an initial TP value according to an embodiment of the present invention.

FIG. 3 is a diagram showing an algorithm for calculating an initial TP value according to an embodiment of the present invention.

Figure 4:
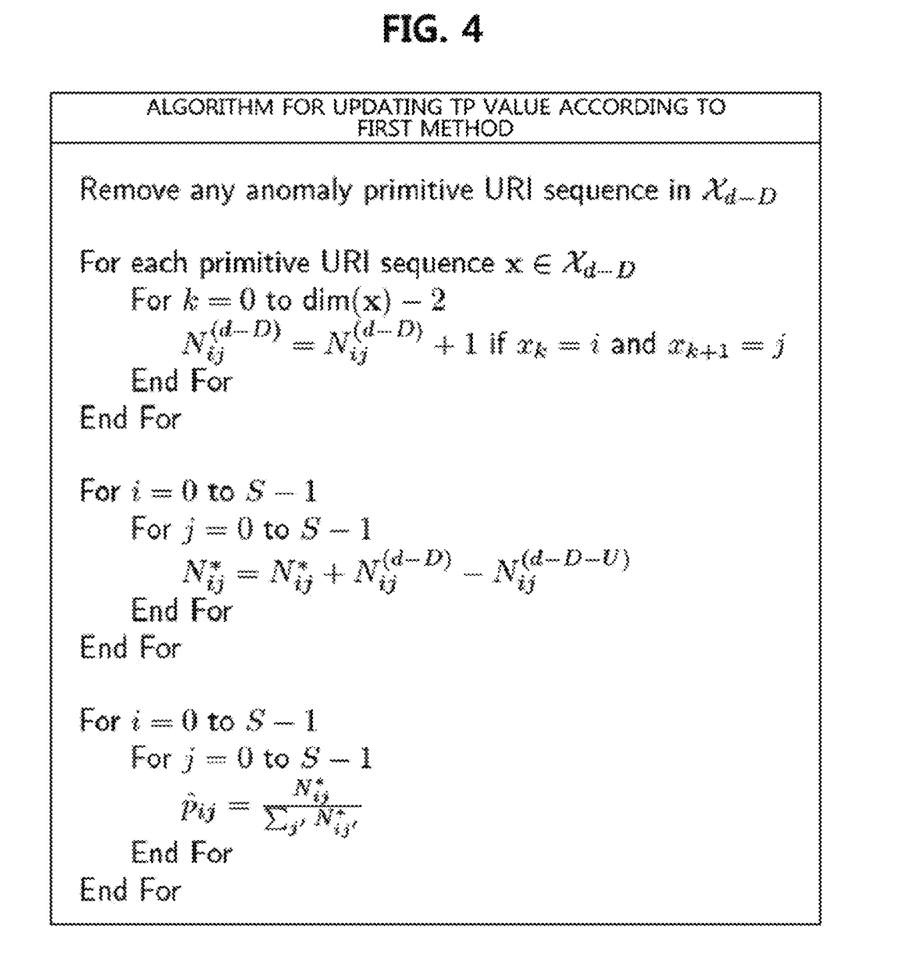
FIG. 4 is a diagram showing an algorithm for updating a TP value according to a first method of using a primitive URI sequence generated from a date on which a user's behavior occurs to a reference date according to an embodiment of the present invention.

FIG. 4 is a diagram showing an algorithm for updating a TP value according to a first method of using a primitive URI sequence generated from a date on which a user's behavior occurs to a reference date according to an embodiment of the present invention.

Figure 5:
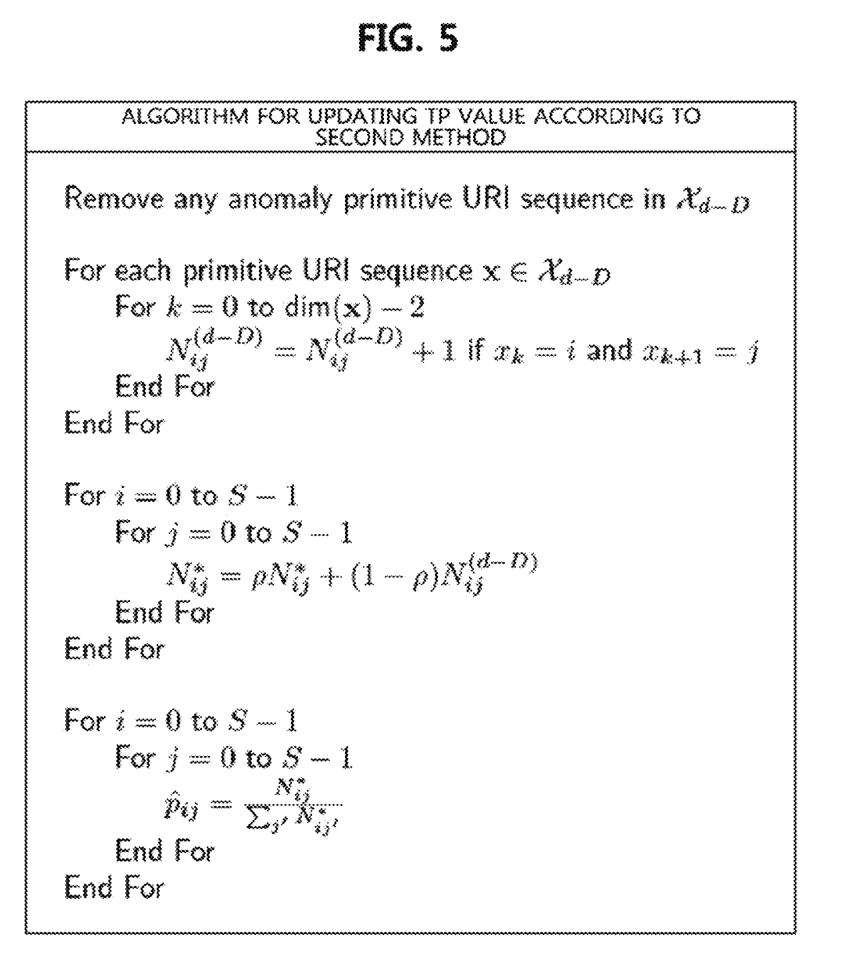
FIG. 5 is a diagram showing an algorithm for updating a TP value according to a second method of using a portion of a primitive URI sequence from a date on which a user's behavior occurs to a reference date according to an embodiment of the present invention.

FIG. 5 is a diagram showing an algorithm for updating a TP value according to a second method of using a portion of a primitive URI sequence generated from a date on which a user's behavior occurs to a reference date according to an embodiment of the present invention. In FIGS. 3 to 5, S may indicate the number of primitive URIs, and U may indicate the number of dates on which primitive URIs are generated. $N_{ij}$ may indicate the number of times an $i^{th}$ primitive URI and a $j^{th}$ primitive URI are consecutively generated, and $\hat{p}_{ij}$ may indicate a transition probability in which the $i^{th}$ primitive URI transitions to the $j^{th}$ primitive URI. $X_{ini}$ may indicate a set of primitive URI sequences for calculating an initial TP value, and $X_d$ may indicate a set of primitive URI sequences in Day d. $x_k$ may indicate a $k_{th}$ factor of a vector x, and ρ may indicate a forgetting factor having a value ranging from 0 to 1.

Figure 6:
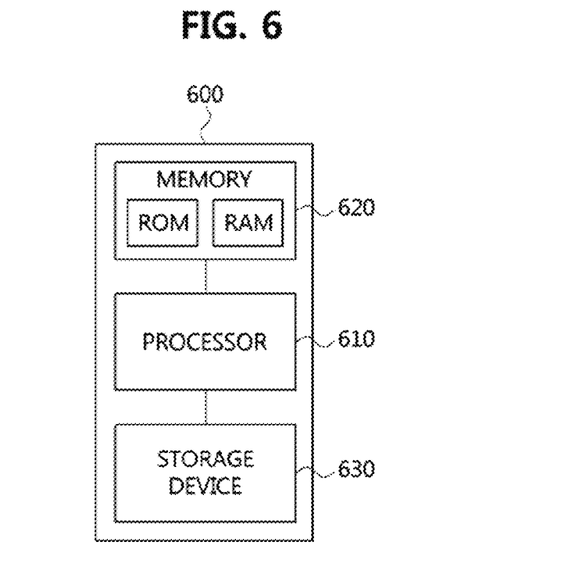
FIG. 6 is a block diagram of an abnormal behavior detection apparatus according to an embodiment of the present invention.

FIG. 6 is a block diagram of an abnormal behavior detection apparatus according to an embodiment of the present invention.

Referring to FIG. 6, an abnormal behavior detection apparatus 600 according to an embodiment of the present invention may include at least one processor 610, a memory 620, and a storage device 630.

The processor 610 may execute program commands stored in the memory 620 and/or the storage device 630. The processor 610 may refer to a central processing unit (CPU), a graphics processing unit (GPU), or a dedicated processor by which methods according to the present invention are performed. The memory 620 and the storage device 630 may be composed of a volatile and/or non-volatile storage medium. For example, the memory 620 may be composed of a read only memory (ROM) and/or a random access memory (RAM).

The memory 620 may store at least one command executed through the processor 610. The at least one command may include a command for acquiring a URI from a user's behavior, a command for generating a URI sequence from the URI on the basis of a predetermined time interval, a command for preprocessing the URI sequence to generate a primitive URI sequence, a command for calculating a log probability value from the primitive URI sequence, and a command for detecting whether the user's behavior is an abnormal behavior on the basis of the log probability value and a predetermined threshold value.

Here, the command for generating a URI sequence from the URI on the basis of a predetermined time interval may include a command for, when there are a plurality of URIs, comparing a time interval between temporally adjacent URIs to the predetermined time interval and generating at least one URI sequence including at least one of the plurality of URIs.

Here, the command for preprocessing the URI sequence to generate a primitive URI sequence may include a command for deleting a key value from at least one URI included in the URI sequence to generate the primitive URI sequence.

Here, the command for calculating a log probability value from the primitive URI sequence may include a command for calculating a transition probability on the basis of at least one primitive URI included in the primitive URI sequence and a command for calculating a log probability value on the basis of the transition probability.

Here, the command for calculating a transition probability on the basis of at least one primitive URI included in the primitive URI sequence may include a command for calculating the transition probability on the basis of the primitive URI sequence and a primitive URI sequence generated from a preset date to a reference date corresponding to the date on which the user's behavior occurs.

Here, the reference date corresponding to the date on which the user's behavior occurs may be determined as a preset number of days before the date on which the user's behavior occurs.

Here, the command for detecting whether the user's behavior is an abnormal behavior on the basis of the log probability value and a predetermined threshold value may include a command for determining the user's behavior as an abnormal behavior when the log probability value is less than the predetermined threshold value.

Figure 7:
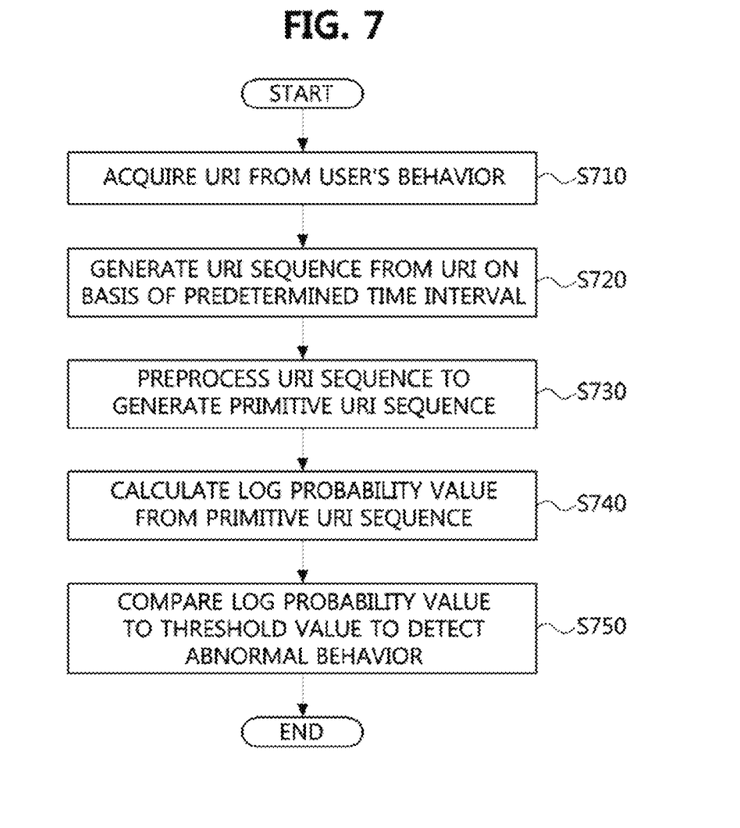
FIG. 7 is a flowchart of an abnormal behavior detection method according to an embodiment of the present invention.

FIG. 7 is a flowchart of an abnormal behavior detection method according to an embodiment of the present invention.

Referring to FIG. 7, the abnormal behavior detection apparatus according to an embodiment of the present invention may acquire a URI from a user's behavior (S710) and generate a URI sequence from the URI on the basis of a predetermined time interval (S720). Here, when there are a plurality of URIs, the abnormal behavior detection apparatus may compare a time interval between temporarily adjacent URIs to the predetermined time interval and generate at least one URI sequence including at least one of the plurality of URIs.

The abnormal behavior detection apparatus may preprocess the URI sequence to generate a primitive URI sequence (730). Here, the abnormal behavior detection apparatus may generate the primitive URI sequence by deleting a key value from at least one URI included in the URI sequence.

The abnormal behavior detection apparatus may calculate a log probability value from the primitive URI sequence (S740). Here, the abnormal behavior detection apparatus may calculate a transition probability on the basis of at least one primitive URI included in the primitive URI sequence and calculate a log probability value on the basis of the transition probability. Also, the abnormal behavior detection apparatus may calculate the transition probability on the basis of the primitive URI sequence and a primitive URI sequence generated from a preset date to a reference date corresponding to the date on which the user's behavior occurs and may determine the reference date corresponding to the date of the user's behavior as a preset number of days before the date on which the user's behavior occurs.

The abnormal behavior detection apparatus may detect whether the user's behavior is an abnormal behavior on the basis of the log probability value and a predetermined threshold value (S750). In other words, when the log probability value is less than the predetermined threshold value, the abnormal behavior detection apparatus may determine that the user's behavior is an abnormal behavior.

The operation according to an embodiment of the present invention may be implemented using a computer-readable program or code in a computer-readable recording medium. The computer-readable recording medium includes all types of recording devices in which data readable by a computer system is stored. Also, the computer-readable recording medium can also be distributed over network-coupled computer systems so that the computer-readable program or code is stored and executed in a distributed fashion.

Also, the computer-readable recording medium may include a hardware device specially configured to store and perform program instructions, such as a read-only memory (ROM), a random access memory (RAM), a flash memory, and the like. The program instructions may include not only a machine language code generated by a complier but also a high-level language code executable by a computer using an interpreter, and the like.

Some aspects of the present invention have been described in the context of an apparatus, but may also represent the corresponding method. Here, a block or the apparatus corresponds to a step of the method or a characteristic of a step of the method. Likewise, aspects which have been described in the context of the method may be indicated by the corresponding blocks or items or characteristics of the corresponding apparatus. Some or all steps of the method may be performed by (or using) a hardware device, such as a microprocessor, a programmable computer, or an electronic circuit. In some embodiments, one or more of important steps of the method may be performed by such a device.

In exemplary embodiments, a programmable logic device (e.g., a field-programmable gate array (FPGA)) may be used to perform some or all functions of the above-described methods. In exemplary embodiments, the FPGA may operate in combination with a microprocessor for performing one of the above-described methods. In general, the methods may be performed by any hardware device.

According to the present invention, it is possible to detect whether an attacker steals access information of a user allowed to access groupware and then infiltrates the groupware.

According to the present invention, it is possible for a plurality of users to safely perform a common project in separate work environments.

While the present invention has been described with reference to exemplary embodiments, it will be understood by those skilled in the art that variations and modifications of the invention may be made without departing from the spirit and scope of the invention as defined by the appended claims.

What is claimed is:

1. A method of detecting whether a groupware user's behavior is an abnormal behavior, the method comprising:
acquiring a uniform resource identifier (URI) from the groupware user's behavior;
generating a URI sequence from the URI on a basis of a predetermined time interval;
preprocessing the URI sequence to generate a primitive URI sequence;

calculating a log probability value from the primitive URI sequence; and detecting whether the groupware user's behavior is an abnormal behavior on a basis of the log probability value and a predetermined threshold value.

2. The method of claim 1, wherein the generating of the URI sequence from the URI on the basis of the predetermined time interval comprises, when the URI is provided as a plurality of URIs, comparing a time interval between temporally adjacent URIs to the predetermined time interval and generating at least one URI sequence including at least one of the plurality of URIs.

3. The method of claim 1, wherein the preprocessing of the URI sequence to generate the primitive URI sequence comprises generating the primitive URI sequence by deleting a key value from at least one URI included in the URI sequence.

4. The method of claim 1, wherein the calculating of the log probability value from the primitive URI sequence comprises:

calculating a transition probability on the basis of at least one primitive URI included in the primitive URI sequence; and calculating the log probability value on the basis of the transition probability.

5. The method of claim 4, wherein the calculating of the transition probability on the basis of the at least one primitive URI included in the primitive URI sequence comprises calculating the transition probability on the basis of the primitive URI sequence and a primitive URI sequence generated from a preset date to a reference date corresponding to a date on which the user's behavior occurs.

6. The method of claim 5, wherein the reference date corresponding to the date on which the user's behavior occurs is determined as a preset number of days before the date on which the user's behavior occurs.

7. The method of claim 1, wherein the detecting of whether the user's behavior is the abnormal behavior on the basis of the log probability value and the predetermined threshold value comprises determining that the user's behavior is an abnormal behavior when the log probability value is less than the predetermined threshold value.

8. An apparatus for detecting whether a groupware user's behavior is an abnormal behavior, the apparatus comprising:

a processor; and a memory in which at least one command to be executed by the processor is stored, wherein the at least one command is executed to:

acquire a uniform resource identifier (URI) from the groupware user's behavior;

generate a URI sequence from the URI on a basis of a predetermined time interval;

preprocess the URI sequence to generate a primitive URI sequence;

calculate a log probability value from the primitive URI sequence; and detect whether the groupware user's behavior is an abnormal behavior on a basis of the log probability value and a predetermined threshold value.

9. The apparatus of claim 8, wherein, when the URI is provided as a plurality of URIs, the at least one command is executed to compare a time interval between temporarily adjacent URIs to the predetermined time interval and generate at least one URI sequence including at least one of the plurality of URIs.

10. The apparatus of claim 8, wherein the at least one command is executed to generate the primitive URI sequence by deleting a key value from at least one URI included in the URI sequence.

11. The apparatus of claim 8, wherein the at least one command is executed to calculate a transition probability on the basis of at least one primitive URI included in the primitive URI sequence and is executed to calculate the log probability value on the basis of the transition probability.

12. The apparatus of claim 11, wherein the at least one command is executed to calculate the transition probability on the basis of the primitive URI sequence and a primitive URI sequence generated from a preset date to a reference date corresponding to a date on which the user's behavior occurs.

13. The apparatus of claim 12, wherein the reference date corresponding to the date on which the user's behavior occurs is determined as a preset number of days before the date on which the user's behavior occurs.

14. The apparatus of claim 8, wherein, when the log probability value is less than the predetermined threshold value, the at least one command is executed to determine the user's behavior as an abnormal behavior.

* * * * *